United States Patent
Kennedy et al.

(10) Patent No.: US 10,387,484 B2
(45) Date of Patent: Aug. 20, 2019

(54) MOBILE DEVICE FOR DISPLAYING A TOPOGRAPHICAL AREA DEFINED BY A BARCODE

(75) Inventors: Benedict John Howard Kennedy, Basingstoke (GB); Michael J. Giannetta, Centerport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1166 days.

(21) Appl. No.: 13/556,327

(22) Filed: Jul. 24, 2012

(65) Prior Publication Data

US 2014/0027503 A1    Jan. 30, 2014

(51) Int. Cl.
  *G06K 19/00*    (2006.01)
  *G06F 16/58*    (2019.01)

(52) U.S. Cl.
  CPC .................... *G06F 16/58* (2019.01)

(58) Field of Classification Search
  USPC ................. 235/435, 439, 451, 462
  See application file for complete search history.

(56) References Cited

U.S. PATENT DOCUMENTS

| | | |
|---|---|---|
| 6,824,058 B2 | 11/2004 | Patel et al. |
| 7,573,523 B2 | 8/2009 | Taniguchi |
| 7,589,747 B2 | 9/2009 | Matsui et al. |
| 7,991,220 B2 | 8/2011 | Nagai et al. |
| 8,019,148 B2 | 9/2011 | Morita et al. |
| 8,624,725 B1* | 1/2014 | MacGregor ........... H04W 4/028 340/539.13 |
| 2003/0125043 A1* | 7/2003 | Silvester ....................... 455/456 |
| 2008/0112700 A1 | 5/2008 | Foxenland et al. |
| 2009/0267895 A1 | 10/2009 | Bunch et al. |
| 2011/0079639 A1* | 4/2011 | Khan ........................... 235/375 |
| 2011/0082747 A1 | 4/2011 | Khan et al. |
| 2012/0113145 A1 | 5/2012 | Adhikari et al. |
| 2012/0116920 A1 | 5/2012 | Adhikari et al. |
| 2012/0165046 A1 | 6/2012 | Rhoads et al. |
| 2014/0358331 A1* | 12/2014 | Prada Gomez ...... G05D 1/0061 701/2 |

OTHER PUBLICATIONS

International Search Report and Written Opinion dated Jun. 5, 2014 in counterpart PCT application PCT/US2013/49954.
Rose, Stephen, et al., "Augmented Reality: A Review of Available Augmented Reality Packages and Evaluation of Theirm Potential use in an Educational Context Learning and Teaching Innovation Grants" Nov. 1, 2010, URL: http://blogs.exeter.ac.uk/augmentedreality/files/2010/11/Augmented-Reality-final.pdf.
Extended European Search Report for corresponding European Application No. 13740147.7 dated Apr. 12, 2016.

* cited by examiner

Primary Examiner — Matthew Mikels (57) ABSTRACT

A mobile device is described. The mobile device includes a camera capturing an image of a barcode. The barcode includes information relating to a location of an object relative to a location of the barcode. A processor is coupled to the camera for decoding the barcode. A processor determines the location of the object in response to decoding the barcode. A display is coupled to the processor for displaying the object in a field of view of the camera. The processor instructs the display to visually accentuate the displayed object based on the determined location of the object.

20 Claims, 6 Drawing Sheets

MOBILE DEVICE FOR DISPLAYING A TOPOGRAPHICAL AREA DEFINED BY A BARCODE

TECHNICAL FIELD

The present disclosure relates generally to a device and method for displaying a topographical area defined by a barcode.

BACKGROUND

Warehouse workers retrieve items from warehouse shelves using a predefined list in order to package the items for delivery to customers. The worker can carry a mobile device that designates an aisle and a shelf in the warehouse where each item can be found. Once the worker is in the general vicinity of the item, the worker is required to scan the shelves by eye to locate each item.

SUMMARY

In one aspect, the invention is embodied in a mobile device. The mobile device includes a camera for capturing an image of a barcode. The barcode includes information relating to a location of an object relative to a location of the barcode. A processor is coupled to the camera for decoding the barcode. The processor determines the location of the object in response to decoding the barcode. A display is coupled to the processor for displaying the object in a field of view of the camera. The processor instructs the display to visually accentuate the displayed object based on the determined location of the object.

In one embodiment, the mobile device also includes a memory for storing the information relating to the location of the object relative to the location of the barcode. The memory can also store a dimension of the object. The mobile device can also include a transceiver for communicating with a remote device. The remote device can include a memory for storing information related to the barcode.

The processor of the mobile device can determine a distance between the camera and the barcode based on comparing a dimension of the barcode determined from the captured image of the barcode with a known dimension of the barcode. In one embodiment, the processor determines where to visually accentuate the displayed object on the display based on a location of the barcode determined from the captured image of the barcode.

The display can indicate a direction to move the camera to display the object on the display. In one embodiment, visually accentuating the displayed object includes outlining the displayed object. The mobile device also includes a motion sensor for sensing a motion of the mobile device. The processor receives data from the motion sensor to compensate for changes in orientation of the mobile device. The display can be a touch screen display.

In another aspect, the invention is embodied in a method for displaying a topographical area defined by a barcode. The method includes capturing an image of the barcode using a camera. The barcode includes information relating to a location of the topographical area relative to a location of the barcode. The barcode is decoded. The location of the topographical area is determined in response to decoding the barcode. The topographical area is displayed in a field of view of the camera. The displayed topographical area is visually accentuated based on the determined location of the topographical area.

In one embodiment, the method further includes storing the information relating to the location of the topographical area relative to the location of the barcode. The method can also include storing a dimension of the topographical area. The method can also include communicating with a remote device. The remote device can store information related to the barcode.

In one embodiment, the method also includes determining a distance between the camera and the barcode based on comparing a dimension of the barcode determined from the captured image of the barcode with a known dimension of the barcode. The displayed topographical area is visually accentuated by determining a location of the barcode from the captured image of the barcode. In one embodiment, a direction to move the camera to display the topographical area is indicated. The method can also include sensing a motion of the camera.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional data capture, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to a mobile device for displaying a topographical area defined by a barcode. The mobile device can be a mobile device having a trigger control for activating an image capture function of the mobile device. The mobile device includes a camera for capturing an image in the field of view of the camera upon activation of the trigger control. The image includes at least one barcode symbol. The barcode includes information relating to a location of an object relative to a location of the barcode.

A processor is coupled to the camera. The processor decodes the barcode. The processor determines the location of the object in response to decoding the barcode. A display coupled to the processor displays the object in a field of view of the camera. The processor instructs the display to visually accentuate the displayed object based on the determined location of the object.

Figure 1:
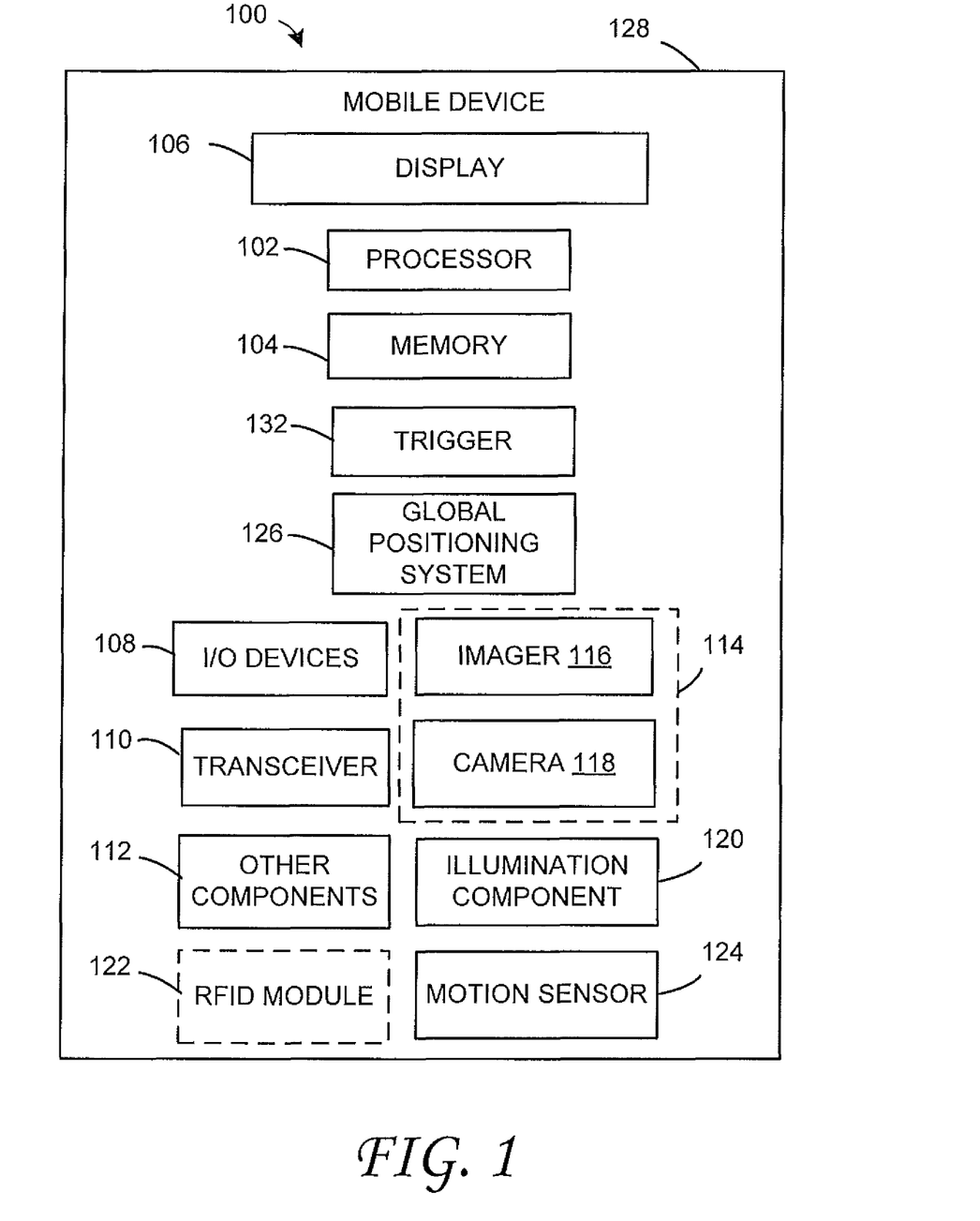
FIG. 1 is a block diagram of the components of a mobile device according to one embodiment of the present invention.

FIG. 1 is a block diagram of the components of a mobile device 100 according to one embodiment of the present invention. The mobile device 100 can be any portable device such as a mobile computer, a mobile phone, a personal digital assistant, a Smartphone, a tablet, etc. As illustrated in FIG. 1, the mobile device 100 can include a processor 102, a memory 104, a display 106, an input/output (I/O) device 108, a transceiver 110, other components 112 such as a portable power supply (e.g., a battery), at least one image capture device 114, such as an imager 116 and/or a camera 118, an illumination component 120, a radio frequency identification module 122, a motion sensor 124, such as an accelerometer, and a global positioning system (GPS) module 126.

The processor 102 can provide conventional functionalities for the mobile device 100. In a specific example according to the exemplary embodiments of the present invention and as will be described in further detail below, the mobile device 100 can include a plurality of software applications that are executed on the processor 102 such as a software application related to a data capture functionality. The memory 104 can also provide conventional functionalities for the mobile device 100. For example, the memory 104 can store data and software applications related to operations performed by the processor 102.

As will be described in further detail below and in a specific example according to the exemplary embodiments of the present invention, the memory 104 can also store images and video received from the image capture device 114. Furthermore, the memory 104 can store image capture data received from the image capture device 114 and/or RFID data received from the RFID module 122.

The display 106 can be any component configured to display data to a user. The display 106 can include, for example, a liquid crystal display (LCD) at least partially disposed within a housing 128 of the mobile device 100. The I/O device 108 can be any component configured to receive an input from the user. For example, the I/O device 108 can be a keypad (e.g., alphanumeric keypad, numeric keypad, etc.). The I/O device 108 can also include a touch sensing pad for a user to enter inputs manually with a finger or a stylus. According to one embodiment, the display 106 can also incorporate the I/O device 108 in a touch screen configuration. For example, the I/O device 108 can be a transparent touch sensor placed over the display 106 that enables a user to enter inputs by touching the touch sensor.

The transceiver 110 can provide the mobile device 100 with a method of exchanging data with a communications network. According to another exemplary embodiment of the present invention, the image in the field of view of the image capture device 114 can be displayed on a display of a remote device (not shown). As such, the transceiver 110 can transmit the image data to the remote device. The remote device can also be coupled to the mobile device 100 though a hard wired connection. The other components 112 can include additional components conventionally found in electronic devices, such as a battery, charging circuitry, and one or more antennas, for example.

The image capture device 114 can be any component configured to capture image data, such as the imager 116 or the camera 118. For example, the imager 116 can include any type of image sensor or sensors. The imager 116 can capture an image in a field of view (FoV) of the imager 116. In one embodiment, the image captured in the FoV of the imager 116 is displayed on the display 106. It should be noted that the FoV can be a linear field, an area field, or a 3-dimensional field, depending on the configuration of the imager 116.

The mobile device 100 can include an illumination component 120 to illuminate an area including the FoV of the imager 116. The illumination component 120 can improve the performance of the imager 116, particularly when there is insufficient light for a suitable image to be captured.

In one embodiment, the image capture device 114 can generate an image in the FoV of the image capture device 114. In one mode of operation, the mobile device 100 including the image capture device 114 can be manually positioned by the user to capture a desired image. A trigger control 132 can be activated by the user to trigger the image capture device 114 to capture the image. For example, the trigger control 132 can include a control icon displayed on the display 106. Alternatively, the trigger control 132 can embody a dedicated trigger control switch located on the mobile device 100 that can be used to trigger the image capture device 114 to capture the image or to activate other functionality of the mobile device 100.

In one embodiment, the image capture device 114 can automatically capture the image containing the at least one barcode symbol without user intervention. The automatic capture can be performed automatically upon the data capture functionality being initiated, or upon the image capture device 114 recognizing at least one barcode symbol within the FoV of the image capture device 114. The image captured in the FoV of the image capture device 114 can be displayed on the display 106.

It should be noted that the memory 104 can store a software application having an image editing functionality such that the processor 102 can execute the software application. Accordingly, the captured image displayed on the display 106 can be rotated (e.g., clockwise, counter-clockwise, etc.), flipped (e.g., horizontally, vertically, etc.), filtered, skewed, sharpened, brightened, darkened, etc. The user can modify the captured image using the software application, to make the image processing more consistent.

It should also be noted that the image editing functionality can be automatically performed prior to displaying the image on the display 106 or can be manually performed by the user by displaying a first captured image on the display 106 and then permitting the user to manipulate the image as desired.

As previously described, the display 106 can include the I/O device 108 in the form of a touch screen to enable the user to enter inputs directly on the touch screen. The processor 102 can generate a graphical user interface (GUI) on the display 106 to provide icons corresponding to certain functionality. The GUI can also include the trigger control 132 to activate the image capture device 114 for capturing the image or for capturing a picture or video. The processor 102 can decode a barcode symbol present in the captured image. In one embodiment, the barcode symbol can be decoded locally by the processor 102. Alternatively, barcode symbol can be decoded remotely by a remote device (not shown).

Different techniques can be employed to decode the barcode symbols contained in the captured image. In one embodiment, the image capture device 114 can be configured to capture and pre-decode the barcode symbols contained in the captured image.

In another embodiment, the image capture device 114 can capture the image containing the barcode symbol and transmit the image to a remote device for processing. The remote device can include a processor that decodes the barcode symbol contained in the image. Accordingly, the processor in the remote device pre-decodes the barcode symbols in the image and transmits the data to the mobile device 100. In one embodiment, the data can be stored in the memory 104 of the mobile device 100. Thus, when the user captures the barcode symbol, the processor 102 can retrieve the corresponding data from the memory 104.

As previously described, the mobile device 100 can include the transceiver 110 for communicating and exchanging data with other devices. According to one embodiment of the present invention, the image capture device 114 of the mobile device 100 can capture the image in the FoV of the image capture device 114. The transceiver 110 of the mobile device 100 can transmit the image data to a remote device including a display. The remote display can display the image captured by the imager 116 of the mobile device 100.

It should also be noted that the use of the transceiver 110 is only exemplary for this embodiment. As previously described, the mobile device 100 can include the other components 112 including an interface (e.g., a port for receiving a first end of a cable and a port on the remote device for receiving a second end of the cable) to couple the mobile device 100 to the remote device.

In operation, the dimensions of a topographical area containing an object of interest such as a shelf, draw, cabinet, wall, or open space can be measured using conventional techniques. For example, the topographical area can be measured using a tape measure. The dimensions of the topographical area can be stored in the memory 104 of the mobile device 100. In one embodiment, the dimensions of the topographical area can be stored in a remote device, such as a server that can communicate with the mobile device 100. Storing the dimensions in a single location is one advantage of using a remote device, such as a server. The dimension information can also include the shape of the area. For example, the shape of the area can be rectangular.

A barcode symbol containing information relating to a location of the topographical area relative to the barcode is located near the topographical area. For example, the information can contain coordinates of the topographical area relative to the location of the barcode symbol. The location information can be stored in the barcode symbol. Alternatively, the barcode symbol can contain a pointer to acquire the location information from the memory 104 of the mobile device 100. The location information can also be obtained from a remote device that communicates with the mobile device 100.

In one embodiment, the barcode symbol is printed on a label and the label is affixed to a wall, shelf, or other object located in the vicinity of the topographical area of interest. The barcode symbol is preferably located on a structure that is substantially stationary relative to the topographical area. Thus, in one embodiment, the barcode symbol can be located on a shelf of a movable cart when the topographical area encompasses objects of interest positioned on the shelf of the cart. In this example, although the cart is movable, the topographical area is stationary relative to the barcode symbol.

According to one embodiment, the mobile device 100 can be a mobile computer having the trigger control 132 for activating an image capture function of the mobile device 100. The trigger control 132 can be a control switch, a button, a soft key, or an icon in a graphical user interface (GUI) presented on the display 106 of the mobile device.

The mobile device 100 includes one or more image capture devices 114, such as the imager 116 and/or the camera 118 for capturing an image in the field of view of the image capture device 114 upon activation of the trigger control 132. The image includes the barcode symbol containing the information relating to the location of the topographical area. The mobile device 100 decodes the barcode symbol and determines the location of the topographical area in response to information stored in the barcode symbol. For example, the barcode symbol can include coordinate information as well as shape and dimension information of the topographical area. In one embodiment, the memory 104 of the mobile device 100 contains the location and dimension information and the barcode symbol contains a pointer to that information. In another embodiment, a remote server can contain the location and dimension information.

The mobile device 100 can include the display 106, such as a touch screen display, for displaying an image of the barcode symbol and the area surrounding the barcode symbol. A software application executing on the processor 102 instructs the display 106 to display an image of the topographical area. The image of the topographical area can be refreshed in real-time. Alternatively, the image of the topographical area can be updated periodically.

The software application can instruct the display 106 to visually accentuate the displayed image of the topographical area based on the determined location of the topographical area. For example, the software application can draw an outline around the image of the topographical area. In another example, the software application can superimpose a highlighted outline over the image of the topographical area while leaving the remainder of the displayed image untouched. In another example, the software application can de-color the topographical area while leaving the remainder of the displayed image untouched. In practice, any suitable technique for visually accentuating the topographical area can be used.

In one embodiment, the software application can use video and image analytics to determine image properties. For example, in one embodiment, if the image of the topographical area is too large to be completely viewed on the display, the software application can instruct the display 106 to automatically reduce a magnification level until the image of the topographical area is completely viewable on the display 106. The software application can also automatically rotate the image to portrait or landscape mode to optimize the view of the topographical area.

In one embodiment, if the topographical area is located outside the field of view of the image capture device 114, the software application can instruct the display 106 to indicate a direction in which the image capture device 114 should be moved in order to view the topographical area. The indicator can be a pointer drawn on the display 106 that indicates the direction to move the device 100 to display the topographical area. The software application uses video analytics to determine when the topographical area is appropriately displayed. The processor 102 can also use data from the motion sensor 124 to track the motion of the mobile device 100.

In one embodiment, the indicator can automatically disappear when the topographical area is displayed. In another embodiment, the indicator changes to a non-pointing shape when the topographical area is displayed. If the position of the device is changed and the topographical area shifts out of the field of view, the indicator can change back to a pointing shape and indicate the direction to reposition the device 100 to display the topographical area. The processor 102 can receive data from the motion sensor 124 to track the orientation and position of the mobile device 100.

In one embodiment, the distance between the image capture device 114 and the topographical area containing the object of interest is determined by the processor 102. This distance allows the processor 102 to calculate the location where the visual accentuation should be positioned on the display 106 of the mobile device 100. The distance can be calculated using various methods including optical techniques, acoustic techniques, and manual measuring techniques. In one embodiment, the processor 102 calculates the distance by using the known dimensions of the captured barcode symbol as described in more detail herein.

Figure 2A:
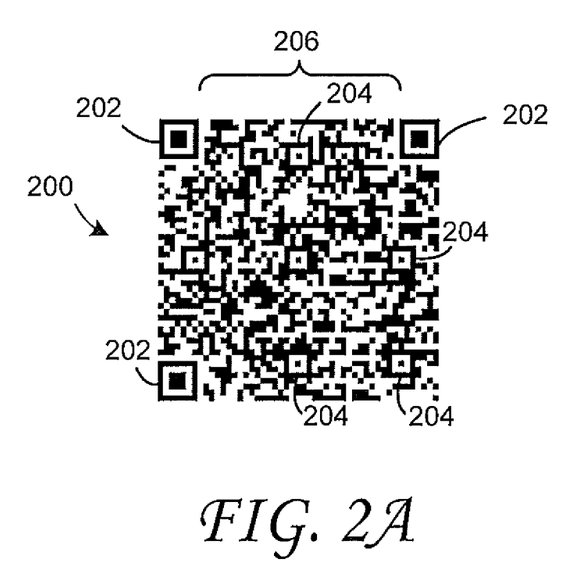
FIG. 2A and FIG. 2B illustrate exemplary barcode symbols containing information relating to a location of an object according to the invention.
Figure 2B:
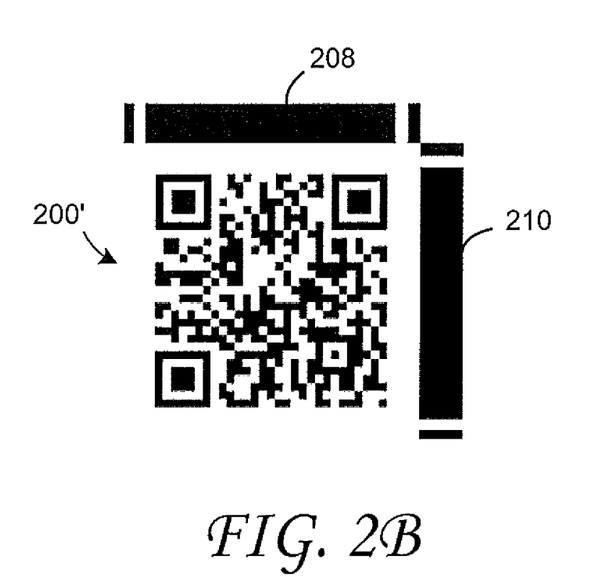

FIG. 2A and FIG. 2B illustrate exemplary barcode symbols 200, 200' containing information relating to a location of an object according to the invention. FIG. 2A is an example of quick response (QR) code™ which is a type of matrix barcode (or two-dimensional code). The QR code generally can store significantly more information than a standard one-dimensional barcode. The barcode includes black modules (square dots) arranged in a square pattern on a white background. The information encoded can be made up of standardized kinds ("modes") of data (numeric, alphanumeric, byte/binary, etc.), or through supported extensions, virtually any type of information can be stored in the barcode.

Each pattern of the barcode symbol 200 includes information required to decode the barcode 200. For example, the barcode 200 includes the position pattern 202, the alignment pattern 204, and a timing pattern.

The distance 206 between the position patterns 202 of the barcode 200 is a known quantity. Thus, the processor 102 of the mobile device 100 (FIG. 1) can determine the distance between the image capture device 114 of the mobile device 100 and the captured barcode 200 by measuring the distance 206 between the position patterns 202 in the captured image of the barcode 200 and calculating the difference between the real distance 206 and the distance measured in the captured image. Taking into account any magnification level affecting the image capture device 114, the processor 102 can calculate the distance between the image capture device 114 and the captured barcode 200.

FIG. 2B illustrates an exemplary barcode symbol 200' containing information relating to a location of an object according to the invention. The barcode symbol 200' includes dimension bars 208, 210 located adjacent to the barcode symbol 200'. The dimension bars 208, 210 include indicia having a known dimension that can be captured by the image capture device 114 and processed by the processor 102. In practice, any suitable indicia that can be captured by the image capture device 114 can be used.

Figure 3:
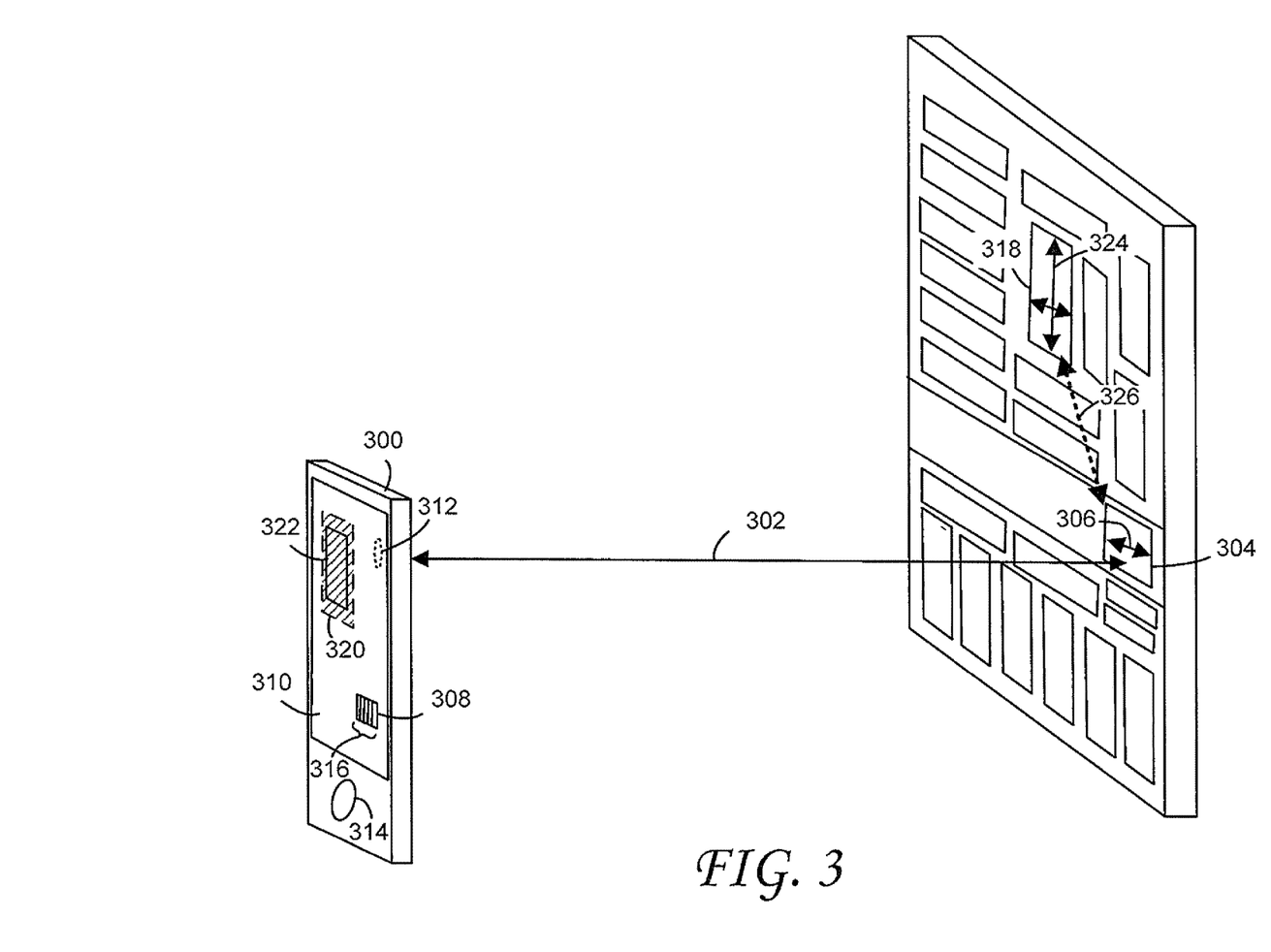
FIG. 3 illustrates a mobile device in operation according to one embodiment of the present invention.

FIG. 3 illustrates a mobile device 300 in operation according to one embodiment of the present invention. The mobile device 300 is located a distance 302 from a barcode symbol 304. The barcode symbol 304 has a known dimension 306. In one embodiment, the known dimension 306 of the barcode symbol 304 is used by the processor 102 (FIG. 1) to calculate the distance 302.

An image 308 of the barcode symbol 304 is displayed on a display 310 when an image capture device 312 of the mobile device 300 is activated. In one embodiment, a control switch 314 can trigger the image capture device 312. The image 308 of the barcode symbol 304 on the display 310 includes an image dimension 316.

A calibration distance between the image capture device 312 and the barcode symbol 304 is initially measured manually to calibrate the image capture device 312 of the mobile device 300. One or more calibration measurements can be made by using a tape measure, for example. Other suitable measurement techniques can also be used, such as optical or acoustic techniques.

The processor 102 uses the calibration measurement(s) to determine the distance 302 based on a ratio of the image dimension 316 to the known dimension 306 and the known magnification level of the image capture device 312.

The processor 102 uses the determined distance 302, the dimension information 324 and the location information 326 of the topographical area of interest 318 to instruct the display 310 where to position the visual accentuation 320 in order to visually accentuate the image 322 of the topographical area of interest 318.

Figure 4:
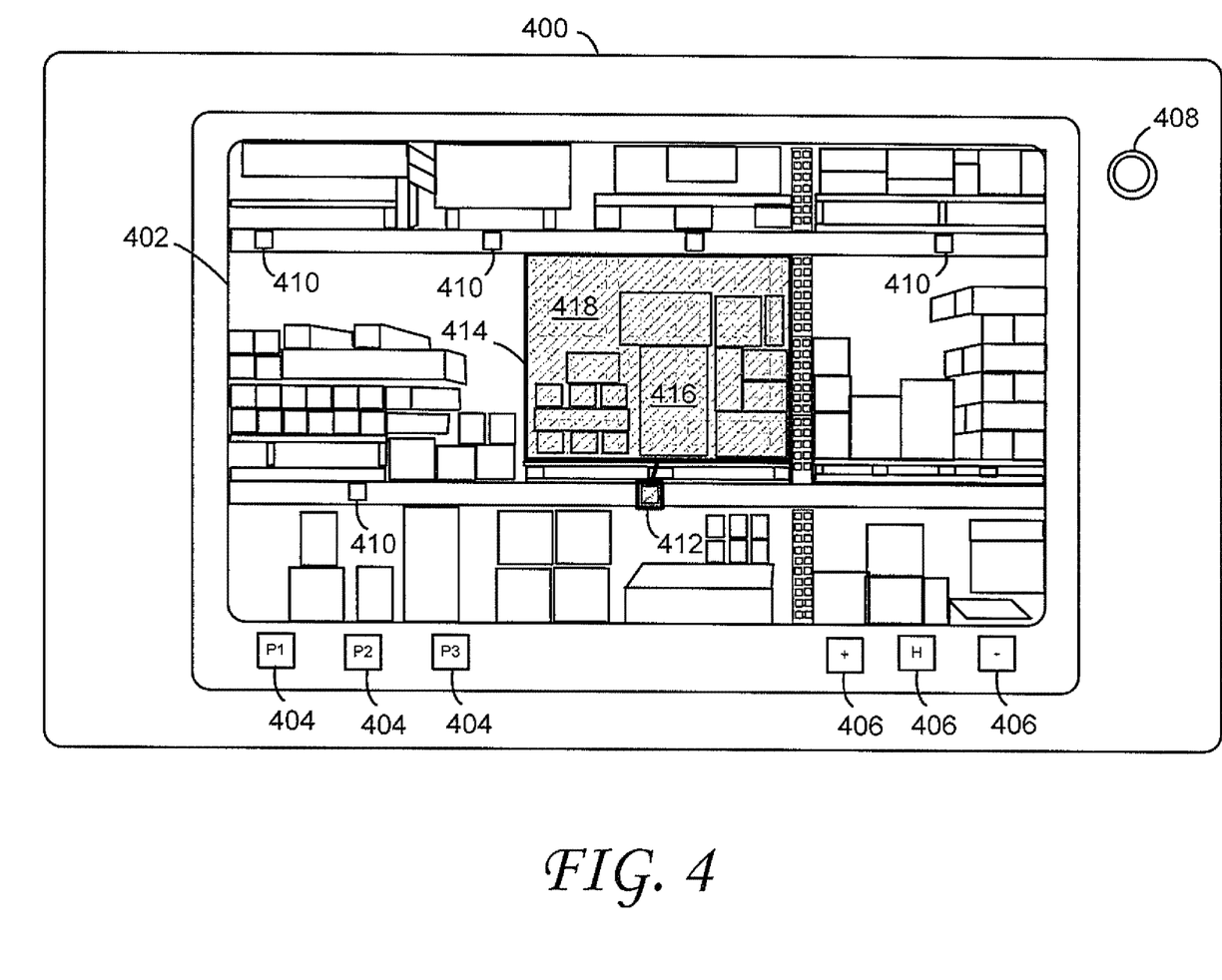
FIG. 4 illustrates a mobile device according to one embodiment of the invention.

FIG. 4 illustrates a mobile device 400 according to one embodiment of the invention. The mobile device 400 includes a display 402. The display 402 is oriented in a landscape view. The mobile device 400 also includes programmable function switches 404 and other input switches 406. The mobile device 400 can also include a front facing camera 408 as well as a rear-facing image capture device (not shown).

The display 402 illustrates an image of multiple shelves having different objects positioned thereon. The image also contains multiple barcode symbols 410. When the rear-facing image capture device of the mobile device 400 captures the image, a software application executing on the processor can locate and decode the barcode symbols 410 in the field of view of the image capture device and determine a barcode symbol 412 corresponding to a topographical area of interest 414. The topographical area 414 can contain one or more objects 416.

In one embodiment, the software application can instruct the display to visually accentuate the topographical area of interest 414. The visual accentuation 418 can include superimposing a semi-transparent highlight over the topographical area of interest 414. In order to instruct the display where to locate the visual accentuation 418, the software application can determine the size, shape and location of the topographical area of interest 414 based on information stored in the barcode symbol 412.

Figure 5:
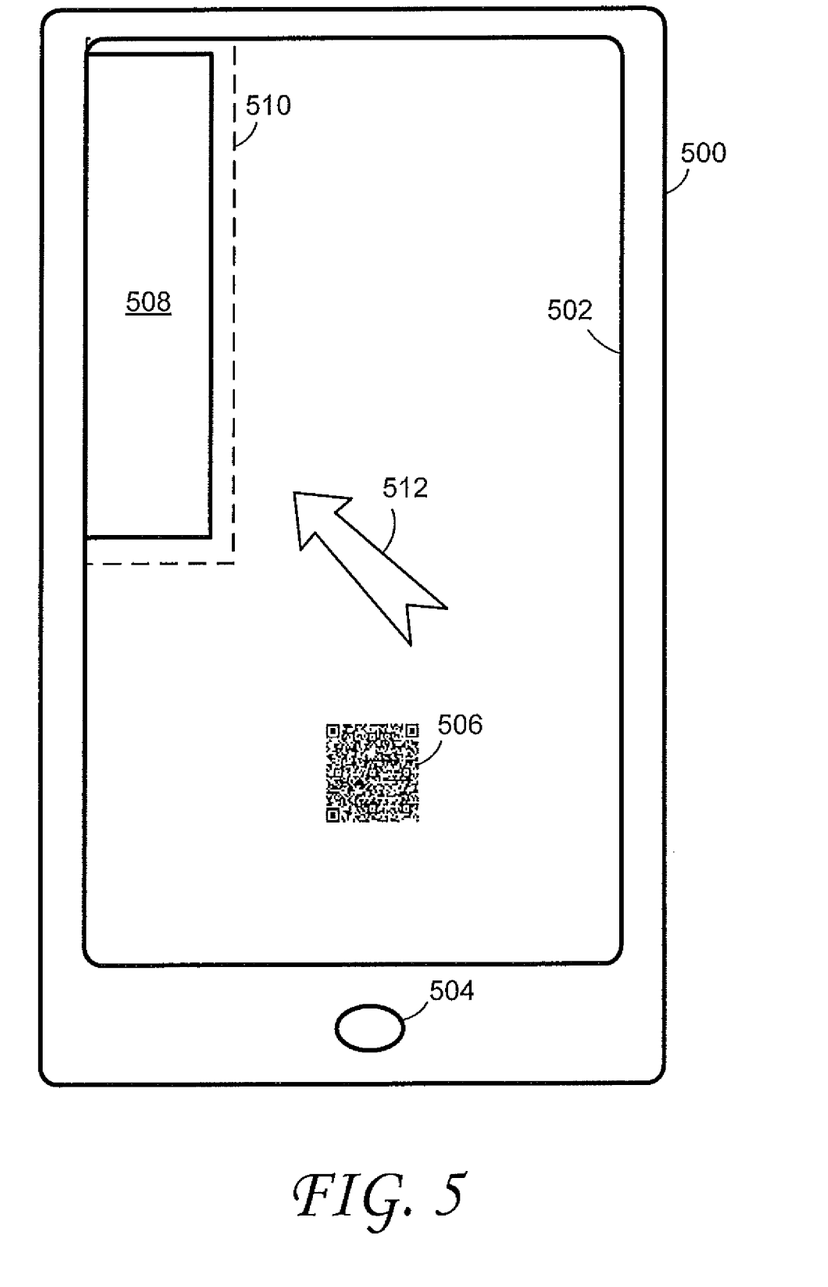
FIG. 5 illustrates a mobile device having a display according to one embodiment of the invention.

FIG. 5 illustrates a mobile device 500 having a display 502 according to one embodiment of the invention. The mobile device 500 can also include at least one control 504. The control 504 can be a sleep/wake switch, a power on/off switch and/or a trigger control. The trigger control can be used to activate an image capture device (not shown) of the mobile device 500, such as a camera.

In one embodiment, a user captures a barcode symbol 506 including location information of a desired object 508. A software application executing on the processor of the device 500 instructs the display 502 to visually accentuate the object 508 on the display 502. For example, the visual accentuation 510 can include an outline. In one embodiment, the entire object 508 or at least a portion thereof, is not in the field of view of the camera. In this embodiment, a software application executing on the processor can draw an indicator 512 on the display 502 that indicates a direction to move the camera to display the object 508 on the display 502. The indicator 512 can be an arrow or other shape indicating directionality.

In one embodiment, the processor can update the direction of the indicator 512 based on data from a motion sensor in the device 500. For example, the processor is aware of the location of the object 506 relative to the captured barcode symbol 506. When a user moves the device 500, the motion sensor senses changes in the orientation and position of the device 500. The processor receives the motion data from the motion sensor and updates the location data of the object 508. The software application executing on the processor can then indicate to a user a direction to move the device 500 in order to view the object 508 on the display 502.

The software application executing on the processor can update the indicator 512 in real time, periodically, or whenever the motion sensor indicates that the device 500 has been moved a predetermined amount.

In one embodiment, the software application executing on the processor can also adjust the magnification level of the object 508. For example, if the magnification level of the display 502 is such that the entire object 508 cannot be displayed on the display 502, the software application can automatically adjust the magnification level, or alternatively, prompt a user to manually adjust the magnification level.

In one embodiment, if the object 508 is too wide to be displayed on the display 502, the software application can prompt a user to rotate the device 500 such that the display 502 will be oriented in a landscape mode. In this embodiment, the software application can rotate the displayed image when the motion sensor indicates that the device 500 has been rotated. In another embodiment, the software application can automatically orient the display 502 to a landscape mode.

Figure 6:
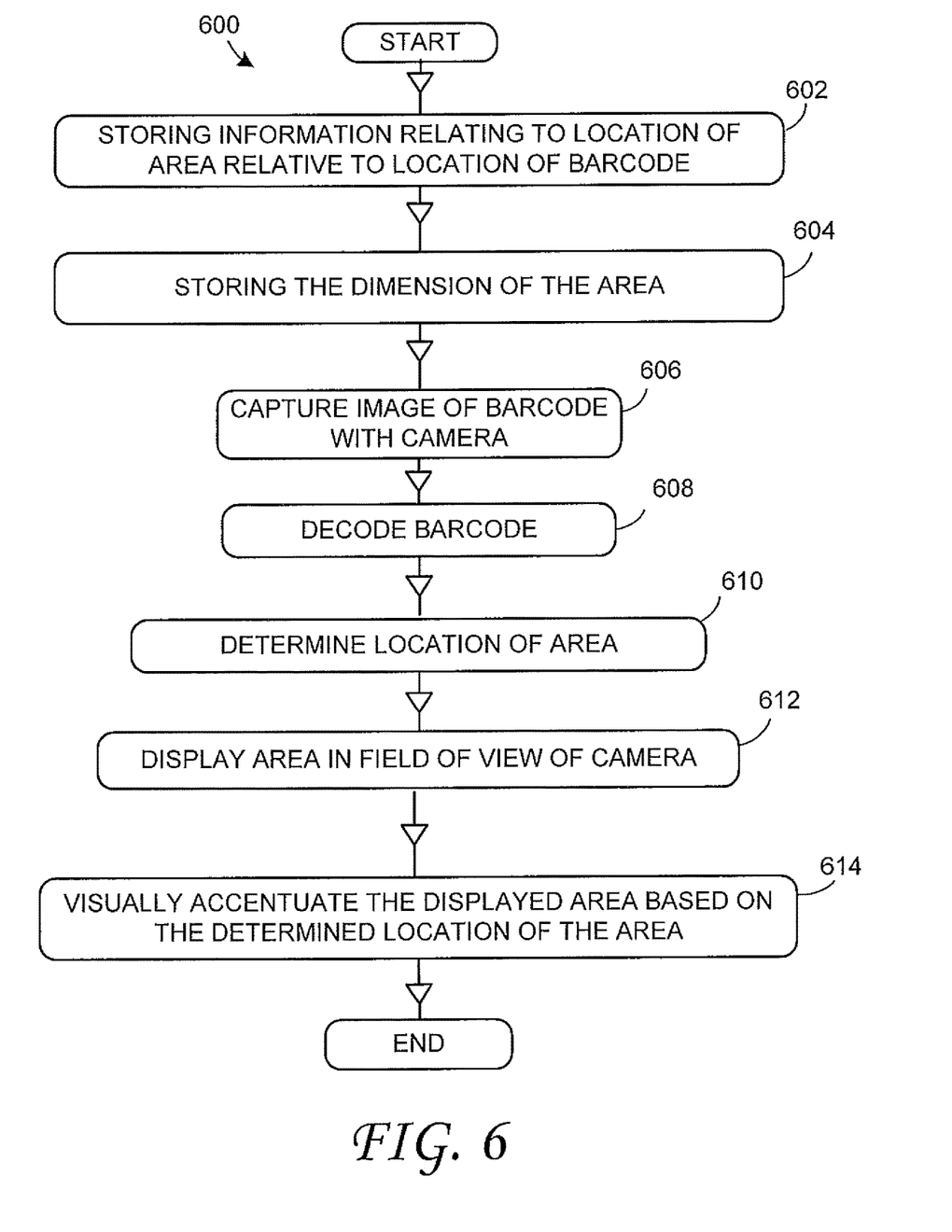
FIG. 6 illustrates a method for displaying a topographical area defined by a barcode according to one embodiment of the invention.

FIG. 6 illustrates a method for displaying a topographical area defined by a barcode according to one embodiment of the invention. In a first optional step 602, information relating to the location of the topographical area of interest relative to the location of the barcode is stored in a memory of the mobile device 100. In one embodiment, the information is stored in a memory of a remote device (not shown). In this embodiment, the mobile device 100 communicates with the remote device such that the mobile device 100 receives the information from the remote device.

The shape and dimensions of the topographical area of interest can also be stored in a memory of the mobile device 100 (step 604). The shape and dimensions of the topographical area of interest can also be stored remotely. In one embodiment, storing the shape and dimensions of the topographical area of interest remotely allows information to be updated in a single remote device and then shared with multiple connected devices.

In step 606, an image of a barcode symbol is captured by an imager or camera of the mobile device 100. The mobile device 100 can save the image of the barcode locally or the mobile device 100 can transmit the image to a remote server. The barcode symbol is decoded either remotely or locally by the mobile device 100 (step 608).

Location information about the topographical area of interest is then retrieved from the decoded barcode (step 610). That information includes, for example, the distance between the barcode symbol and the topographical area of interest. In one embodiment, the information is included as data in the barcode symbol. In another embodiment, the barcode symbol includes an address specifying where the information can be found.

The display 106 of the mobile device 100 can act as a viewfinder in a video mode. In this mode, every object in the field of view of the camera is displayed on the display 106 in real time. The topographical area of interest can also be displayed on the display 106 (step 612). In one embodiment, if the area of interest or a portion thereof is outside the displayed area, the display 106 can display an indicator that prompts a user to move the mobile device 100 in a direction towards the area of interest until the entire area of interest is shown on the display 106. This can be achieved by using video analytics and/or using data received from the motion sensor within the mobile device 100.

The mobile device 100 can visually accentuate the topographical area of interest (step 614). In one embodiment, the visual accentuation includes a semi-transparent overlay that is positioned over the area of interest. In one embodiment, the visual accentuation is a drawn outline that surrounds the area of interest. In yet another embodiment, the visual accentuation includes artificially coloring or highlighting some of all of the objects located in the area of interest.

In one embodiment, in order to accurately determine the size and shape of the visual accentuation, the distance between the mobile device and the area of interest must be known. There are various techniques to determine the distance. In one embodiment, determining a distance between the camera and the barcode is based on comparing a dimension of the barcode determined from the captured image of the barcode with a known dimension of the barcode. For example, by knowing the dimensions of an object (e.g., the barcode symbol) in the field of view of the camera, the distance between the camera and that object can be calculated based on the dimensions of the displayed object shown on the display and the magnification setting of the camera.

Other techniques can also be used, such as "time of flight" optical measurements or audio reflection techniques. In one embodiment, an active RFID tag is positioned near the area of interest, and the RFID reader integrated with the mobile device 100 determines the distance to the tag based on the measured signal strength from the RFID tag. In practice, any suitable method to measure distance can be used, including using a tape measure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A mobile device comprising:
   a camera capturing an image of a barcode, the barcode comprising information containing an object location relative to the barcode's location, wherein the barcode's location is different from the object location;
   a processor coupled to the camera, configured to:
      decode the barcode,
      determine the object location relative to the barcode's location in response to decoding the barcode,
      instruct a display, coupled to the processor, to present an indicator to visually accentuate the object based on the determined object location; and
   the display configured to display the visually accentuated object in a field of view of the camera in response to the instructions.

2. The mobile device of claim 1 further comprising a memory for storing the information containing the object location relative to the barcode's location.

3. The mobile device of claim 2 wherein the memory further stores a dimension of the object.

4. The mobile device of claim 1 further comprising a transceiver for communicating with a remote device, the remote device including a memory for storing information related to the barcode.

5. The mobile device of claim 1 wherein the processor determines a distance between the camera and the barcode based on comparing a dimension of the barcode determined from the captured image of the barcode with a known dimension of the barcode.

6. The mobile device of claim 1 wherein the processor determines where to visually accentuate the displayed object on the display based on the object location relative to the barcode's location determined in response to decoding the barcode.

7. The mobile device of claim 1 wherein the display indicates a direction to move the camera to display the object on the display.

8. The mobile device of claim 1 wherein visually accentuating the displayed object comprises outlining the displayed object.

9. The mobile device of claim 1 further comprising a motion sensor for sensing a motion of the mobile device.

10. The mobile device of claim 9 wherein the processor receives data from the motion sensor to compensate for changes in orientation of the mobile device.

11. The mobile device of claim 1 wherein the display comprises a touch screen display.

12. A method for displaying a topographical area defined by a barcode, comprising:
    capturing an image of the barcode using a camera, the barcode comprising information containing a location of the topographical area relative to the barcode's location, wherein the barcode's location is different from the location of the topographical area;
    decoding the barcode;
    determining the location of the topographical area relative to the barcode's location in response to decoding the barcode;
    displaying the topographical area in a field of view of the camera; and
    presenting an indicator for visually accentuating the displayed topographical area based on the determined location of the topographical area.

13. The method of claim 12 further comprising storing the information containing the location of the topographical area relative to the barcode's location.

14. The method of claim 13 further comprising storing a dimension of the topographical area.

15. The method of claim 12 further comprising communicating with a remote device, the remote device storing information related to the barcode.

16. The method of claim 12 further comprising determining a distance between the camera and the barcode based on comparing a dimension of the barcode determined from the captured image of the barcode with a known dimension of the barcode.

17. The method of claim 12 wherein visually accentuating the displayed topographical area comprises determining the location of the topographical area relative to the barcode's location in response to decoding the barcode.

18. The method of claim 12 further comprising indicating a direction to move the camera to display the topographical area.

19. The method of claim 12 further comprising sensing a motion of the camera.

20. A mobile device comprising:
    a camera for capturing an image of a barcode, the barcode comprising information containing a location of the topographical area relative to the barcode's location, wherein the barcode's location is different from the location of the topographical area;
    means for decoding the barcode;
    means for determining the location of the topographical area relative to the barcode's location in response to decoding the barcode;
    a display for displaying the topographical area in a field of view of the camera; and
    means for presenting an indicator for visually accentuating the displayed topographical area based on the determined location of the topographical area.

* * * * *